(12) United States Patent
Grover et al.

(10) Patent No.: US 12,526,273 B2
(45) Date of Patent: Jan. 13, 2026

(54) BLOCKCHAIN ESCROW AND AUDITING SERVICE

(71) Applicant: MICRO FOCUS LLC, Santa Clara, CA (US)

(72) Inventors: Douglas Max Grover, Rigby, ID (US); Michael F. Angelo, Houston, TX (US)

(73) Assignee: Micro Focus LLC, Santa Clara, CA (US)

( * ) Notice: Subject to any disclaimer, the term of this patent is extended or adjusted under 35 U.S.C. 154(b) by 203 days.

(21) Appl. No.: 18/061,890

(22) Filed: Dec. 5, 2022

(65) Prior Publication Data

US 2024/0187400 A1 Jun. 6, 2024

(51) Int. Cl.
*H04L 9/40* (2022.01)
*H04L 9/00* (2022.01)

(52) U.S. Cl.
CPC .............. *H04L 63/083* (2013.01); *H04L 9/50* (2022.05); *H04L 63/105* (2013.01)

(58) Field of Classification Search
CPC ........ H04L 63/083; H04L 63/105; H04L 9/50
See application file for complete search history.

(56) References Cited

U.S. PATENT DOCUMENTS

| | | | |
|---|---|---|---|
| 11,030,217 B2 | 6/2021 | Vo | |
| 2017/0163733 A1* | 6/2017 | Grefen | .................. H04L 9/3236 |
| 2018/0205555 A1* | 7/2018 | Watanabe | .............. H04L 9/3226 |
| 2019/0238525 A1* | 8/2019 | Padmanabhan | ........ H04L 63/101 |
| 2019/0342290 A1* | 11/2019 | Mittal | .................... H04L 63/083 |
| 2021/0150632 A1* | 5/2021 | Schwartz | .................. H04L 9/50 |
| 2021/0201326 A1* | 7/2021 | Ambikapathi | ..... G06Q 20/4014 |
| 2021/0264420 A1* | 8/2021 | Tammana | .............. G06Q 20/02 |
| 2021/0264444 A1* | 8/2021 | Chen | ...................... G06T 11/00 |
| 2021/0281421 A1* | 9/2021 | Semenovskiy | ..... G06Q 20/3276 |
| 2021/0314163 A1* | 10/2021 | Fabjanski | .......... G06Q 20/3829 |
| 2022/0067035 A1 | 3/2022 | Little | |
| 2023/0185793 A1* | 6/2023 | Farhi | ...................... G06F 16/27 |
| | | | 707/690 |
| 2023/0305884 A1* | 9/2023 | Dimitrov | .............. G06F 9/5077 |

\* cited by examiner

*Primary Examiner* — Vance M Little (74) *Attorney, Agent, or Firm* — Sheridan Ross P.C.

(57) ABSTRACT

A request to authenticate to a Blockchain as a Service (BaaS) is received from a tenant (e.g., a user that is acting on behalf of a corporation). An authentication credential of the tenant associated with the request to authenticate to the BaaS is determined to be valid. In response to determining that the authentication credential of the tenant associated with the request to authenticate to the BaaS is valid, a level of access is granted to the BaaS. A request is received, from the tenant, to add a transaction block to a blockchain in the BaaS. The blockchain in the BaaS is interspersed with transaction blocks from a plurality of tenants of the BaaS. The transaction block is then added to the blockchain in the BaaS. This addition to the BaaS represents both an Escrow and an Audit capability.

20 Claims, 9 Drawing Sheets

BLOCKCHAIN ESCROW AND AUDITING SERVICE

FIELD

The disclosure relates generally to blockchains and particularly to providing blockchain escrow services as part of Blockchain as a Service (BaaS).

BACKGROUND

One of the problems with blockchains is that they involve a lot of resources to setup a distributed ledger. One solution to this is Blockchain as a Service (BaaS). However, existing BaaS solutions are cost prohibitive given the overhead of setting up a system for a limited number of transactions in order to be secured by a blockchain. For example, if a user wanted to only store a couple of transactions in a blockchain, the overhead would be cost prohibitive.

SUMMARY

These and other needs are addressed by the various embodiments and configurations of the present disclosure. The present disclosure can provide a number of advantages depending on the particular configuration. These and other advantages will be apparent from the disclosure contained herein.

A request to authenticate to a Blockchain as a Service (BaaS) is received from a tenant (e.g., a user that is acting on behalf of a corporation). An authentication credential of the tenant associated with the request to authenticate to the BaaS is determined to be valid. In response to determining that the authentication credential of the tenant associated with the request to authenticate to the BaaS is valid, a level of access is granted to the BaaS. A request is received, from the tenant, to add a transaction block to a blockchain in the BaaS. This entry would represent an audit or escrow block. The blockchain in the BaaS is interspersed with transaction blocks from a plurality of tenants of the BaaS. The transaction block is then added to the blockchain in the BaaS.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
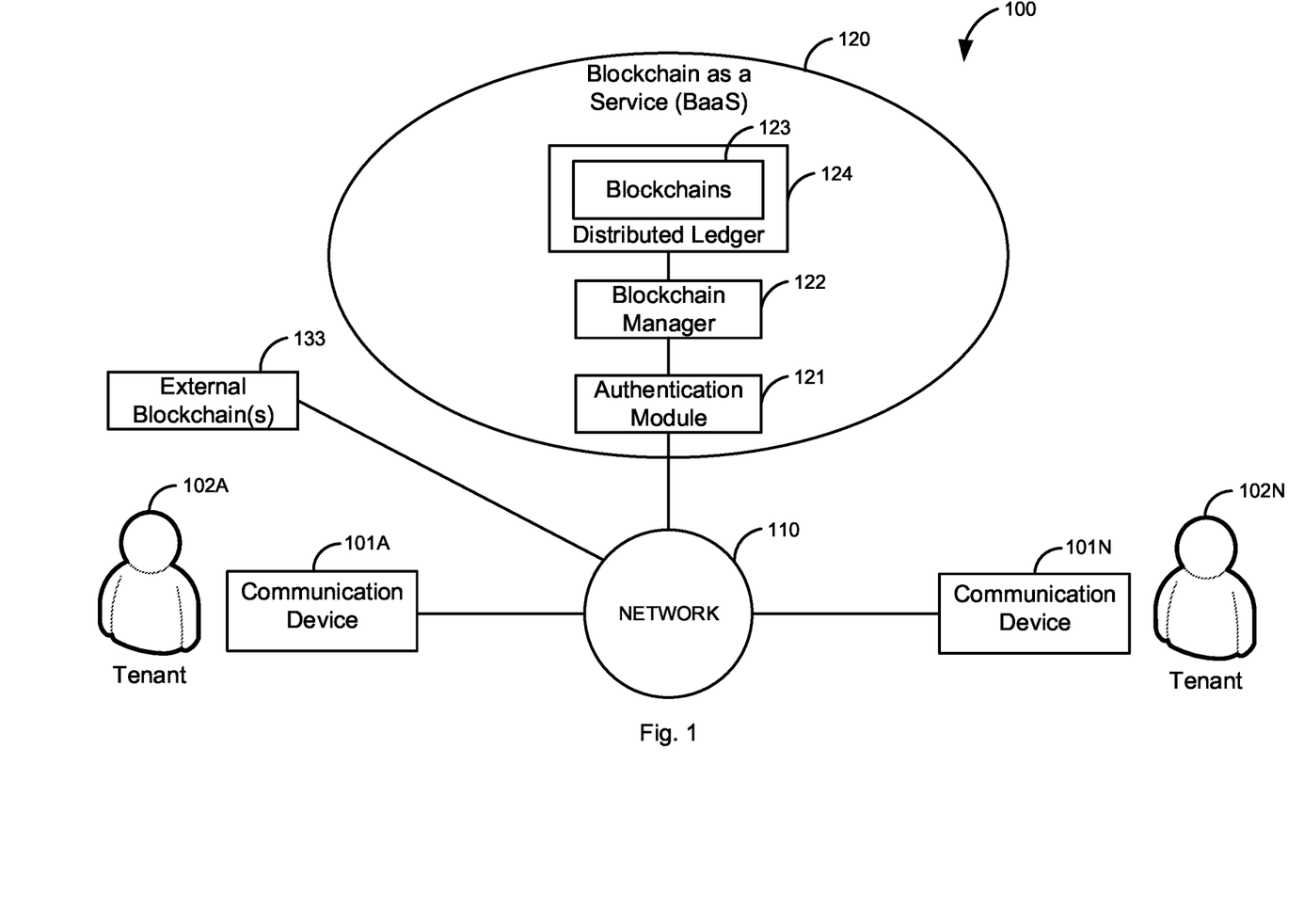
FIG. 1 is a block diagram of a first illustrative system for providing a blockchain escrow and auditing service.

FIG. 1 is a block diagram of a first illustrative system 100 for providing a blockchain escrow and auditing service. The first illustrative system 100 comprises communication devices 101A-101N, a network 110, a Blockchain as a Service (BaaS) 120, and external blockchain(s) 133. In addition, tenants 102A-102N are shown for convenience.

The communication devices 101A-101N can be or may include any device that can communicate with the BaaS 120, such as a Personal Computer (PC), a cellular telephone, a Personal Digital Assistant (PDA), a tablet device, a notebook device, a smartphone, and/or the like. As shown in FIG. 1, any number of communication devices 101A-101N may be connected to the network 110, including only a single communication device 101.

The tenants 102A-102N may be a user, an entity, a corporation, a business, an organization, and/or the like. The tenants 102A-102N use the communication devices 101A-101N to access the BaaS 120.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Transmission Control Protocol (TCP), Hyper Text Transfer Protocol (HTTP), Web Real-Time Protocol (Web RTC), and/or the like. Thus, the network 110 is an electronic communication network configured to carry messages via packets and/or circuit switched communications.

The BaaS 120 is a service that provides the tenant 102 the ability to store and/or access one or more transactions in a blockchain 123. The BaaS 120 comprises an authentication module 121, a blockchain manager 122, and a distributed ledger 124.

The authentication module 121 allows the tenant 102 the ability to provide one or more authentication credentials (e.g., a username/password, fingerprint scan, iris scan, Short Message Service (SMS) code, email code, and/or the like) as part of an authentication process for accessing the blockchains 123 in the distributed ledger 124. The authentication module 121 may support single factor authentication and/or multi-factor authentication. The authentication may occur at a blockchain 123 level and/or block level.

The blockchain manager 122 is used to manage access to the blockchains 123 in the distributed ledger 124. This may include adding transaction blocks, retrieving transaction blocks, blockchain 123 validation, blockchain 123 auditing, tenant 102 auditing, and/or the like.

The distributed ledger 124 comprises multiple copies of the blockchain 123 as a way to provide immutability of tenant information stored in the blockchains 123. As requests to add transaction blocks are received, the transaction blocks are added to the each of the blockchains 123 in the distributed ledger 124. In essence, there are multiple copies of the transaction blocks that are protected using a hashing process.

The external blockchain(s) 133 are blockchain(s) 133 that contain transaction blocks/information that may be stored in the BaaS 120 to keep an external audit log of different transactions of a tenant 102. The external blockchain(s) 133 may comprise any number of transaction blocks and/or any type of transactions.

In FIG. 1, when the different tenants 102A-102N want to add a transaction block to the blockchain 123 in the distributed ledger 124, the tenant 102 authenticates via the communication device 101/authentication module 121 and then requests to save a transaction block in the blockchain 123. The blockchain manager 122 then stores the transaction block in the blockchain 123. A key difference of this service compared to traditional BaaS services is that the transaction blocks in the blockchain 123 are from different tenants 102 (i.e., the transaction blocks from different tenants 102 are interspersed within the blockchain 123) and may be unrelated (even from the same tenant 102).

In addition, different transaction blocks from the same tenant 102 and/or different tenants 102 may contain the different types of information/formats. The tenant 102 may select from a plurality of predefined and/or custom templates how the tenant information will be stored in a transaction block. For example, the tenant 102 may select a contract template for storing a signed contract, select a general template for storing a cryptocurrency transaction, select a document template for storing a document, or the like. Thus, the blockchain 123 may not only have unrelated transaction blocks from the same tenant 102/different tenants 102 but may also tenant have different transaction blocks that are in completely different formats. The template may be selected when the tenant 102 creates an account, based on adding a transaction block, and/or the like.

In FIG. 1, there may be only a single active blockchain 123. An active blockchain 123 is where transaction blocks are actively being added. An inactive blockchain 123 is a blockchain 123 where the blockchain 123 is complete. In FIG. 1, there may be one or more inactive blockchains 123. For example, the BaaS 120 may start a second blockchain 123 after the first blockchain 123 reaches a specific number of blocks. In this case, the first blockchain 123 will be an inactive blockchain 123 (meaning that no more blocks can be added) and the second blockchain 123 will be the active blockchain 123.

Figure 2:
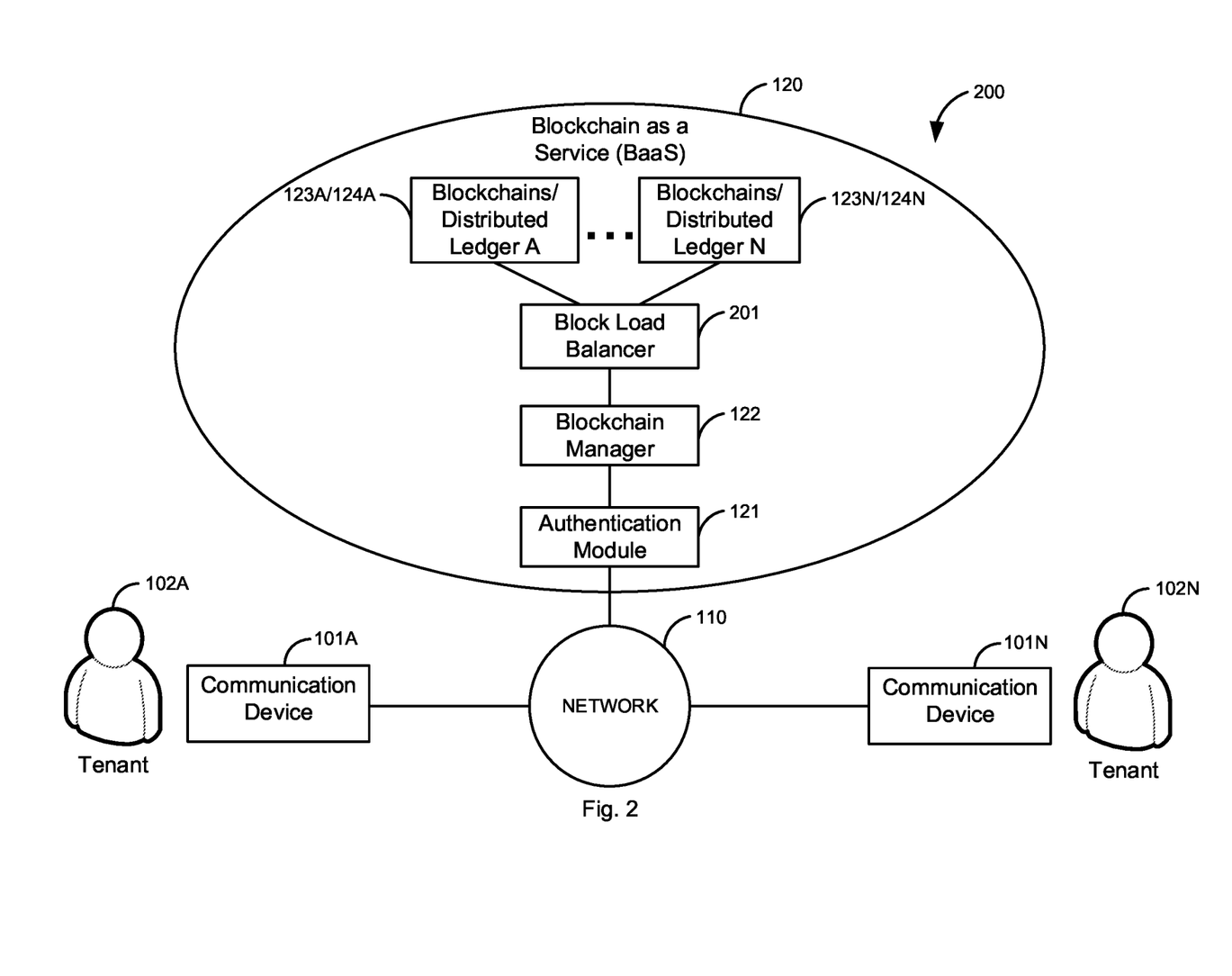
FIG. 2 is a block diagram of a second illustrative system for providing blockchain escrow and auditing services using a block load balancer.

FIG. 2 is a block diagram of a second illustrative system 200 for providing blockchain escrow and auditing services using a block load balancer 201. In FIG. 2, the BaaS 120 is expanded to include a block load balancer 201 that takes requests to add transaction blocks to a blockchain 123/distributed ledger 124 and sends the requests to the least loaded and/or shortest active blockchain 123A-123N. The size of the active blockchain 123 may include a number of blocks, a data size of the blockchain 123 (e.g., disk usage), access speed, and/or the like. In one embodiment, a round robin process may be used to allocate requests to add new transaction blocks to the blockchains 123A-123N.

In FIG. 2, different requests to add transaction blocks to the blockchain 123 from the same tenant 102 may end up being stored in different active blockchains 123 based on a size of the blockchains 123, a loading of the blockchains 123, an allocation algorithm, and/or the like. In FIG. 2, new transaction blocks may be added to the blockchains 123A-123N in parallel. For example, each blockchain 123A-123N may be in a separate container or be running on a separate virtual machine/set of nodes. This embodiment may also work where there are also inactive blockchain(s) 123 along with multiple active blockchains 123A-123N.

Figure 3:
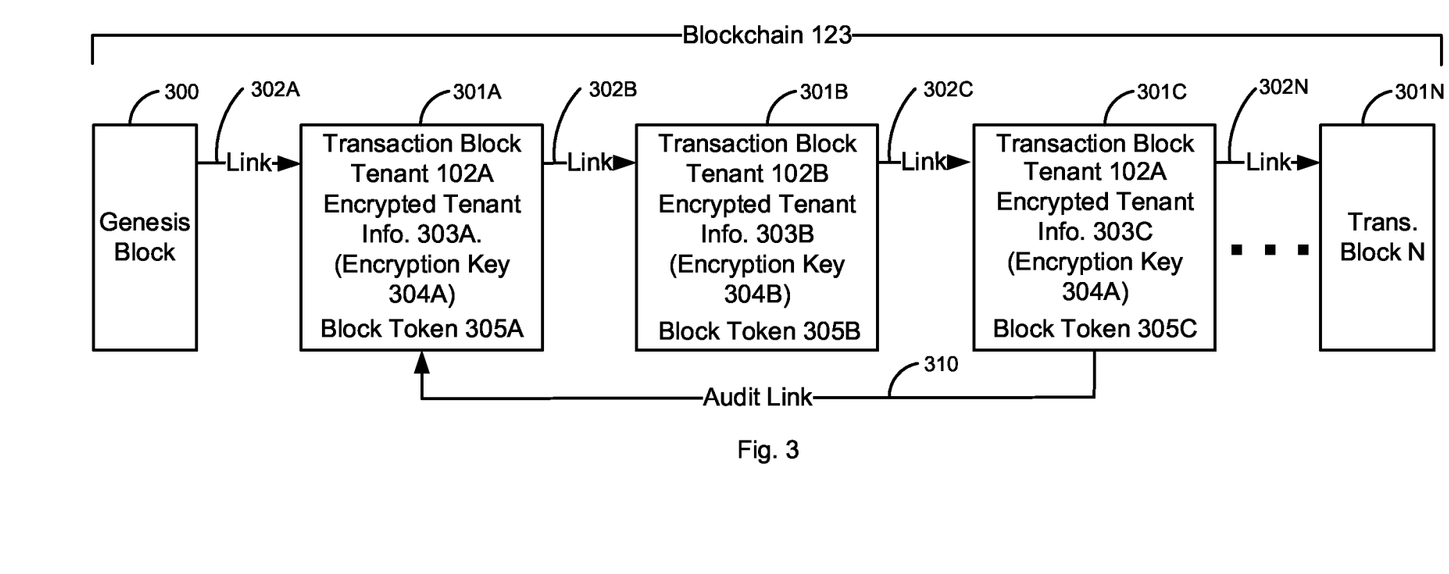
FIG. 3 is a block diagram of a first exemplary blockchain that is used for providing a blockchain escrow and auditing service.

FIG. 3 is a block diagram of a first exemplary blockchain 123 that is used for providing a blockchain escrow and auditing service. The blockchain 123 comprises a genesis block 300, transaction blocks 301A-301N, forward links 302A-302N, and an audit link 310.

The genesis block 300 is the beginning block of the blockchain 123. The transaction blocks 301A-301N are added to the blockchain 123 based on an event associated with a tenant 102. For example, a transaction block 301 may be created when a contract is completed, when a cryptocurrency exchange has taken place, when a user authenticates to a system, when an account is created, when a software release is completed, and/or the like. The transaction blocks 301A-301N are linked together via the forward links 302A-302N. The forward links 302A-302N are used to link together hashes (not shown) of the transaction blocks 301A-301N as is traditionally done with blockchains 123/distributed ledgers 124. The hashes, the forward links 302A-302N, and the distributed ledger 124 help to provide the immutability of the blockchain 123.

In the blockchain 123, the transaction blocks 301A and 301C were added by the tenant 102A. The transaction block 301B was added by the tenant 102B. In other words, the transaction blocks 301A-301C from different tenants (102A/102B) are interspersed in the blockchain 123. If there are transaction blocks 301 from the same tenant 102, they can be linked together for auditing purposes. For example, as shown in FIG. 3, the transaction block 301C has an audit link 310 back to the transaction block 301A. The audit link 310 from the transaction block 301C allows the tenant 102A to audit the transaction block 301A. Thus, if the tenant 102 can access the transaction block 301C, the tenant 102 can also access the transaction block 301A via the audit link 310 (e.g., based on rules).

The audit link 310 may be used to link similar/related transaction blocks 301 from the same tenant 102. If there are different types of transaction blocks 301 from the same tenant 102 that are unrelated, there may be separate audit links 310 for each different type of transaction block. For example, type one transaction blocks 301 may be linked together by a first group of one or more audit links 310 and type two transaction blocks 301 may be linked together by a second group of one or more audit links 310. In other words, the different types of transaction blocks 310 are separately linked.

Since the transaction blocks 301A/301C and 301B are for different tenants 102A-102N, each tenant 102 can encrypt their tenant information 303 in their respective transaction block(s) 301. For example, in FIG. 3, the tenants 102A and 102B each have encrypted their tenant information 303A-303C with their own respective encryption keys (encryption key 304A and encryption key 304B) in the transaction blocks 301A-301C. Although not shown, a tenant 102 may encrypt different parts of the tenant information 303 using different encryption keys 304, encryption key sizes, and/or encryption algorithms.

In addition, the BaaS service provider may encrypt some, or all, of the other information (e.g., one or more specific fields) in the transaction blocks 301A-301N. For example, the BaaS service provider may encrypt the hashes/block tokens 305A-305C in the transaction blocks 301A-301C. Thus, if a nefarious party gains access to the blockchain 123, the tenant's information 303 will still remain secure. Even if the Baas service provider encryption key(s) were compromised, access to the tenant information 303 in the transaction blocks 301A-301C would still be secure. If an individual tenant's encryption key(s) 304A/304B were compromised, the other tenant's information 303 stored in the transaction blocks 301 of the blockchain 123 will still be secure.

When each transaction block 301 is added to the blockchain 123, a block token 305 is generated and stored in the transaction block 301. The tenant 102 then receives the block token 305 for use later in accessing the transaction block 301. The tenant 102 uses the block token 305 along with the proper authentication credentials to access the transaction block(s) 301 that were added by the tenant 102 (or could work where only a block token 305 or authentication credentials are provided). If the tenant 102 has the all the block tokens 305 or even the last block token 305, the tenant 102 can perform an audit of the tenant's transaction blocks 301 in the blockchain 123. For example, the tenant 102A may provide both block tokens 305A and 305C. This allows the tenant 102A to audit the tenant information 303A/303C in the transaction blocks 301A and 301C. If tenant 102A only has the block token 305C, the tenant 102A can also access the tenant information 303A in the transaction block 301A because of the audit link 310 between the transaction blocks 301A/301C. This allows for recovery, or detection of illicit modification. In this embodiment, the audit link 310 may be encrypted so the tenant 102A is the only one who can decrypt the audit link 310 to access and unencrypt the transaction block 301A. If the tenant information 303A/303C in the transaction blocks 301A/301C is encrypted, the tenant 102A can then unencrypt the information in the transaction blocks 301A-301C using the encryption key 304A.

In one embodiment, the use of the audit link 310 back to the previous transaction block 301A of the tenant 102A may not be used. In this case, the tenant 102A will have to provide both block tokens 305A and 305C to do an audit of the tenant's transactions blocks 301A and 301C.

When an active blockchain 123 is ended, it can have a forward link 302 back to the genesis block 300. This locks the blockchain 123 from further additions and makes the blockchain 123 an inactive blockchain 123. Alternatively, the blockchain 123 can be considered inactive with no additional changes allowed by adding an end block (not shown). In addition, a number of blocks for the blockchain may be used to end a blockchain 123.

Figure 4:
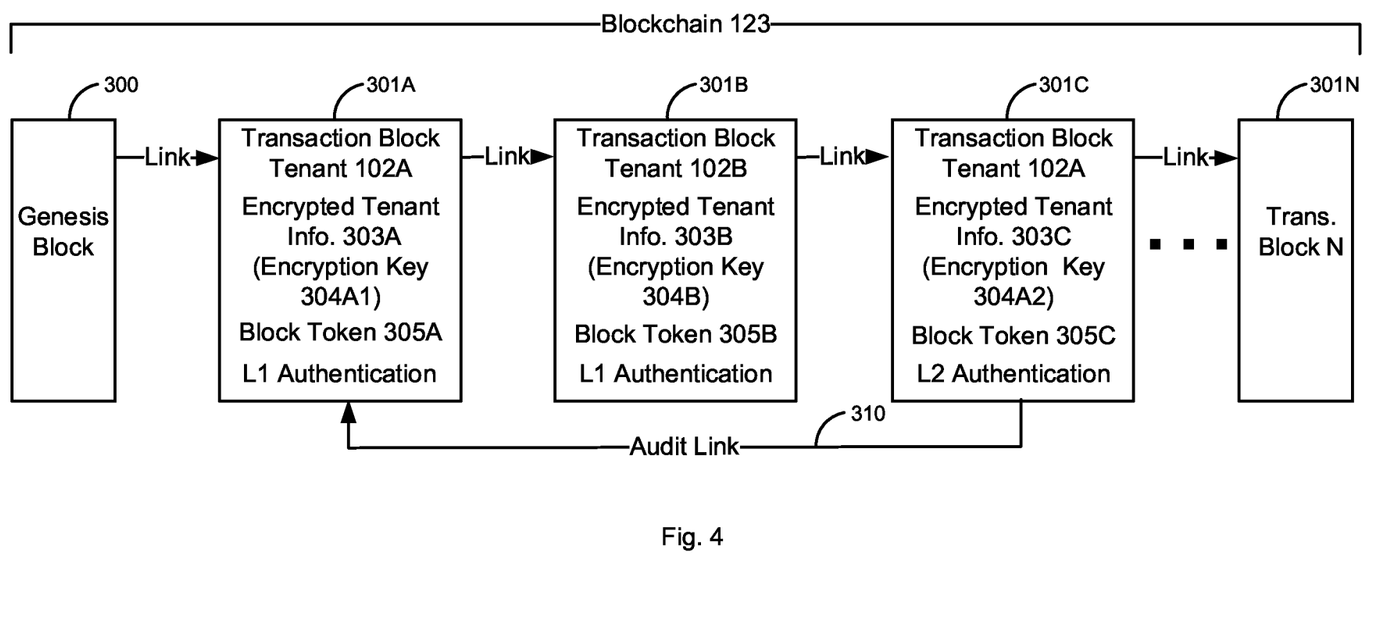
FIG. 4 is a block diagram of a second exemplary blockchain that is used for providing a blockchain escrow and auditing service.

FIG. 4 is a block diagram of a second exemplary blockchain 123 that is used for providing a blockchain escrow and auditing service. FIG. 4 further expands the escrow process to include multi-factor authentication at a transaction block 301 level and/or at an auditing level. In addition, multiple encryption levels/types of encryptions may be used based on the authentication level/tenant 102.

In FIG. 4, each transaction block 301A-301N has an associated authentication level. The specific types of authentications can be stored as part of the transaction block 301. For example, the transaction blocks 301A through 301B require level one authentication (e.g., a username/password). The transaction block 301C requires authentication level two (e.g., a username/password and fingerprint scan). To illustrate, if the tenant 102A authenticates at authentication level one and provides the block tokens 305A and 305C, the tenant 102A will be able to access the transaction block 301A. However, the tenant 102A will not be able to access the transaction block 301C because it requires authentication level two. In this case, the tenant 102A may be asked to provide a valid fingerprint scan to access the tenant information 303C in the transaction block 301C.

In addition, the authentication levels may apply to auditing. For example, to audit all the transactions blocks 301A/301C for tenant 102A, the tenant 102A must provide a valid username/password, a valid SMS code, and a valid fingerprint scan. As one can see, various combinations of authentication levels may be used in various says depending on the tenant's needs.

Moreover, the tenant information 303 may be encrypted using different levels of encryption/types of encryptions. For example, the tenant information 303A in the transaction block 301A may be encrypted using a 256-bit Advanced Encryption Standard (AES) encryption using encryption key 304A1 and the tenant formation 303C for the transaction block 301C may use 512-bit Rivest-Shamir-Adleman (RSA) encryption using the encryption key 304A2 (even though both transaction blocks 301A/303C are for the same tenant 102A).

The tenant 102 may do the types/level of encryption 102 before writing to the blockchain 123. Alternatively, the BaaS service provider may provide the encryption. For example, the tenant 102 may provide an encryption key 304 when adding a transaction block 301 to the blockchain 123 and the BaaS service provider encrypts the tenant information 303.

Figure 5:
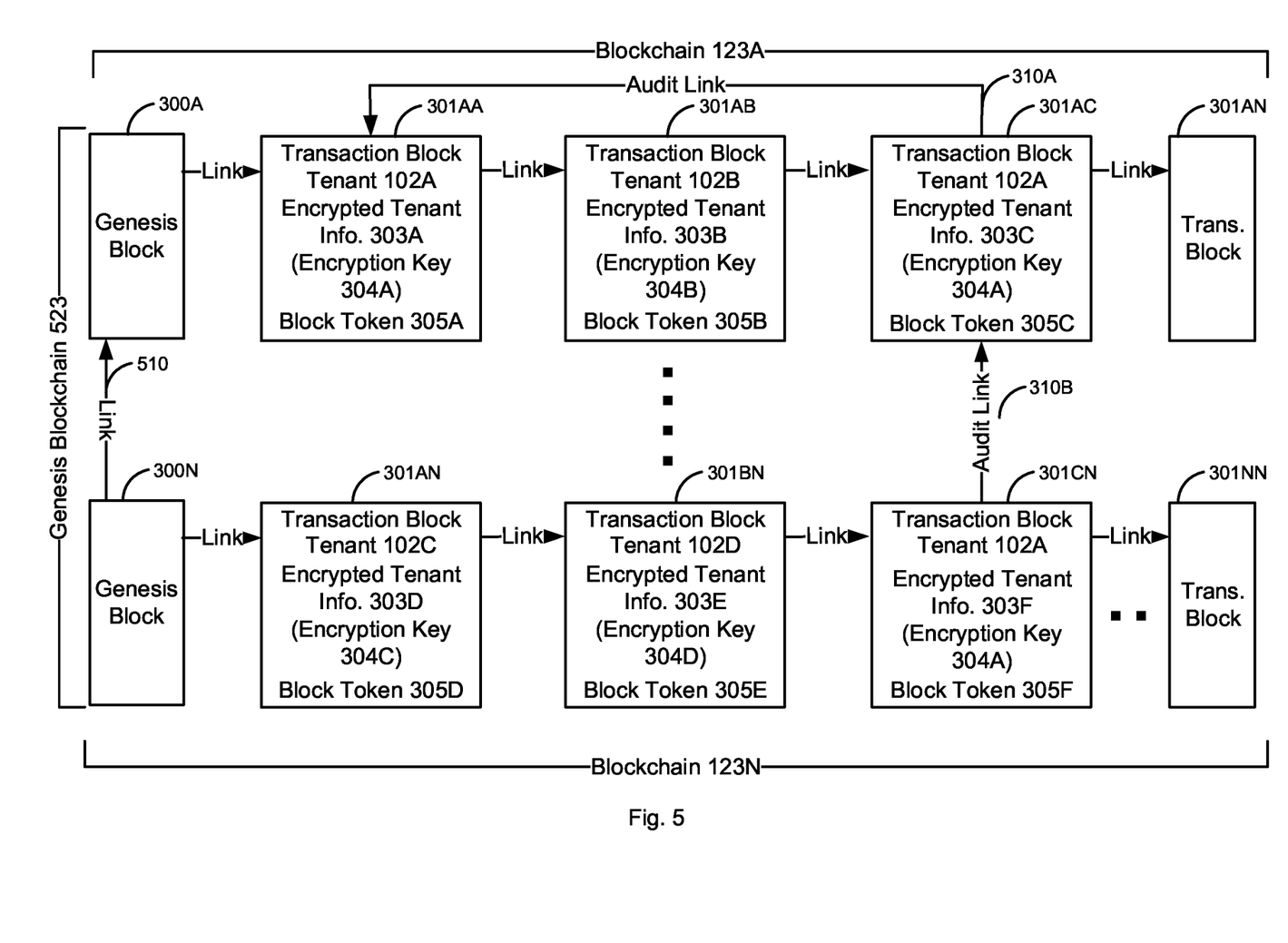
FIG. 5 is a block diagram of a plurality of blockchains that are used to provide a blockchain escrow and auditing service.

FIG. 5 is a block diagram of a plurality of blockchains 123A-123N that are used to provide a blockchain escrow and auditing service. FIG. 5 comprises blockchains 123A-123N. The blockchain 123A comprises a genesis block 300A and transaction blocks 301AA-301AN. The transaction block 301AC has an audit link 310A back to the transaction block 301AA. In FIG. 5, the blockchain 123A is essentially the same blockchain 123 as shown in FIG. 3.

The blockchain 123N comprises a genesis block 300N and transaction blocks 302AN-301NN. The transaction block 301AN was added by the tenant 102C. The transaction block 301BN was added by the tenant 102D. The transaction block 301CN was added by the tenant 102A. The transaction block 301CN has an audit link 310B back to the transaction block 301AC. Because the transaction block 301CN is from the tenant 102A, the audit links 310A-310B links the transaction blocks 301AA, 301AC, and 301CN together to allow the tenant 102A to audit the transactions stored in the transaction blocks 301AA, 301AC, and 301CN using the encryption key 304A to unencrypt the tenant information 303A, 303C, and 303F. The audit link 310B is used to allow for inter blockchain auditing for the same tenant 102A. For example, if the tenant 102A has the block token 305F, the tenant 102A can audit the transaction blocks transaction blocks 301CN, 301AC, and 301AA by following the audit links 310B/310A.

In one embodiment, when a new blockchain (e.g., 123N) is created, it can have a genesis link 510 back to its predecessor genesis block 300. For example, as shown in FIG. 5, the genesis block 300N has a genesis link 519 back to the genesis block 300A. Thus, a genesis blockchain 523 is created to link the two blockchains 123A and 123N together. When completed, the last genesis block 300 in the genesis blockchain 523 may have a link back to the original genesis block 300A that locks the genesis blockchain 523.

The blockchains 123A-123N may only have one active blockchain 123 or have multiple active blockchains 123. For example, the blockchain 123A may be an inactive blockchain 123 and the blockchain 123N may be an active blockchain 123 according to the embodiment described in FIG. 1. Alternatively, the blockchains 123A-123N may all be active blockchains 123 per the embodiment described in FIG. 2. In addition, there may be a combination where there is at least one inactive blockchain 123 and multiple active blockchains 123 that work with the embodiment described in FIG. 2.

Figure 6:
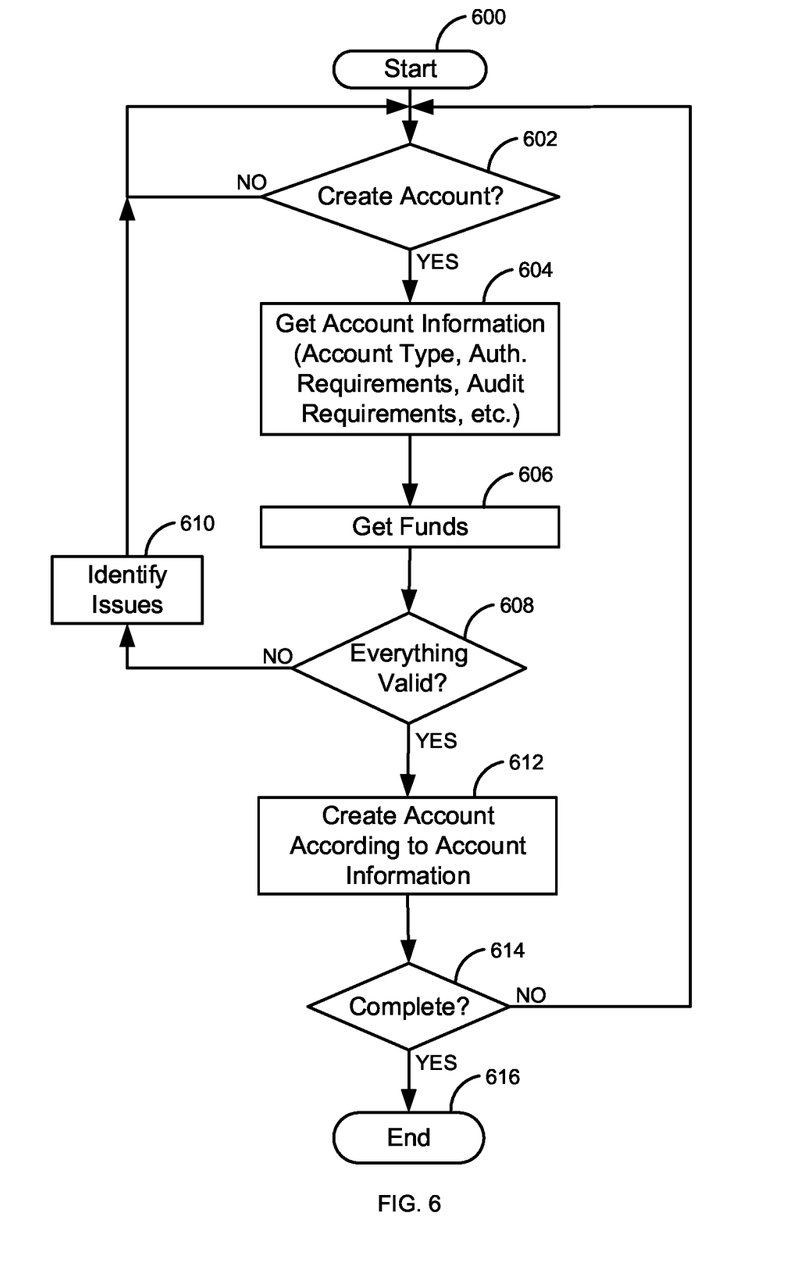
FIG. 6 is a flow diagram of a process for creating an account for a Blockchain as a Service (BaaS).
Figure 7:
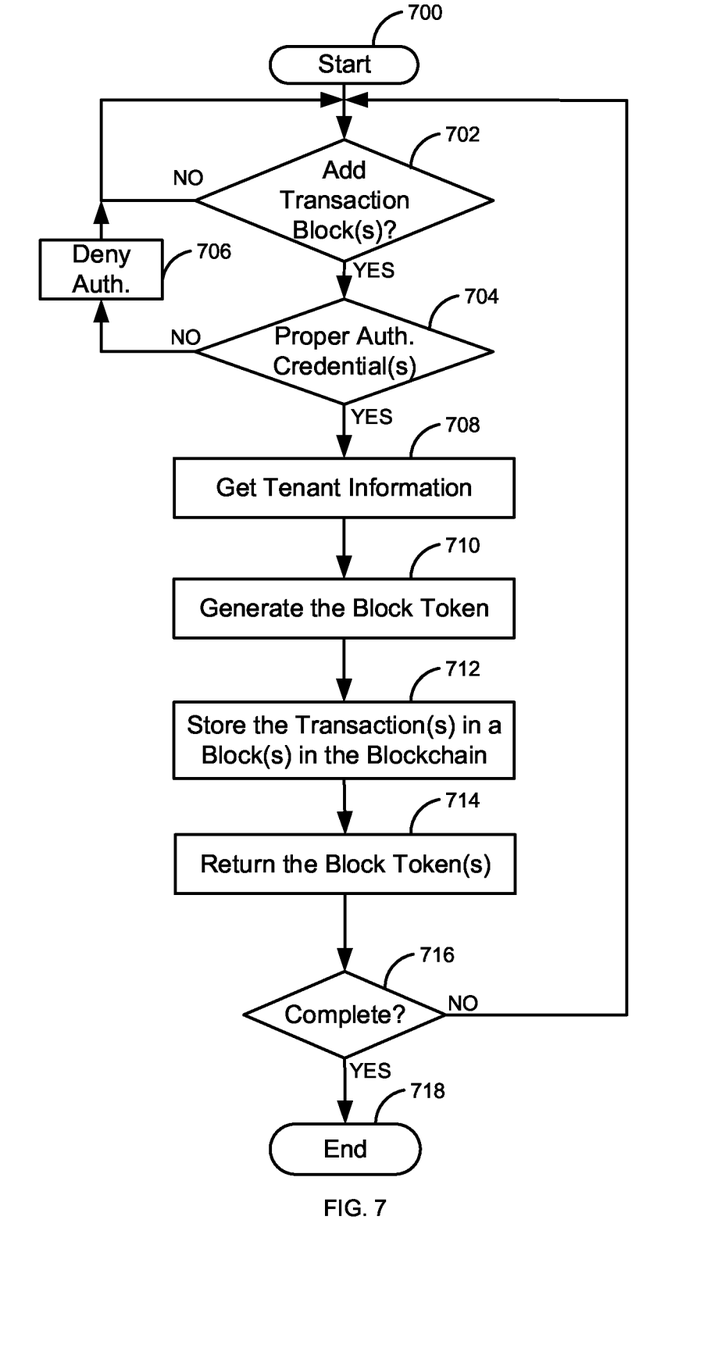
FIG. 7 is a flow diagram for authenticating a tenant in order to add transaction blocks to a blockchain in a distributed ledger.
Figure 8:
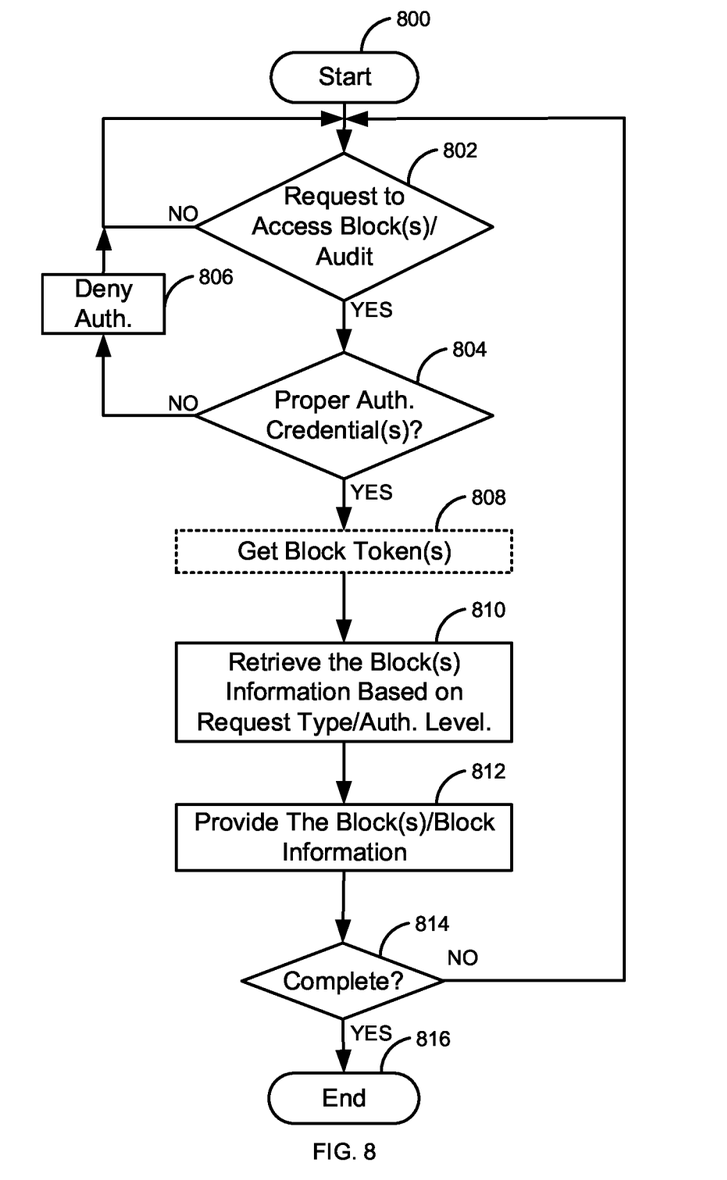
FIG. 8 is a flow diagram for granting access and auditing stored transaction blocks for a Blockchain as a Service (BaaS).

FIG. 6 is a flow diagram of a process for creating an account for a blockchain 123 as a Service (BaaS) 120. Illustratively, the communication devices 101, the BaaS 120, the authentication module 121, the blockchain manager 122, the blockchains 123, the distributed ledger 124, and the block load balancer 201 are stored-program-controlled entities, such as a computer or microprocessor, which performs the method of FIGS. 6-8 and the processes described herein by executing program instructions stored in a computer readable storage medium, such as a memory (i.e., a computer memory, a hard disk, and/or the like). Although the methods described in FIGS. 6-8 are shown in a specific order, one of skill in the art would recognize that the steps in FIGS. 6-8 may be implemented in different orders and/or be implemented in a multi-threaded environment. Moreover, various steps may be omitted or added based on implementation.

The process starts in step 600. The blockchain manager 122 waits for a tenant 102 to make a request to create an account in the BaaS 120 (e.g., via a web page provided by the BaaS 120) in step 602. If a request to create an account is not received in step 602, the process repeats step 602.

Otherwise, if a request to create an account is received in step 602, the blockchain manager 122, in step 604, gets the necessary account information. For example, the account information may include various types of information, such as, information about the tenant 102 (e.g., user names, address information, etc.), an account type (e.g., a single time access account, a pay per use account, a billed account, etc.), authentication requirements/credentials (e.g., authentications level two for all transaction blocks 301, authentication factors for transaction blocks 301, etc.), audit requirements (e.g., different users have different capabilities/authentication credentials), data types (e.g., templates that define an amount of data that can be stored in a transaction block 301, number/types of fields, length of fields, etc.), and/or the like. For example, the tenant 102 may select a template for a transaction block 301 that the tenant 102 may use to customize the transaction information to match the tenant's requirements. If the transaction requires prepayment, the blockchain manager 122 gets the necessary funds, in step 606, to proceed with one or more transactions (e.g., a prepayment).

If there is invalid information or information that was not provided, in step 608 (e.g., from steps 604-606), the issues are identified in step 610 (e.g., via a user interface) and the process goes back to step 602. Otherwise, if all the information is valid in step 608, an account for the tenant 102 is created based on the account information in step 612.

The process determines, in step 614, if the process is complete. If the process is complete in step 614, the process ends in step 616. Otherwise, if the process is not complete in step 614, the process goes back to step 602.

FIG. 7 is a flow diagram for authenticating a tenant 102 in order to add transaction block(s) 301 to a blockchain 123 in a distributed ledger 124. Once the tenant 102 has created an account, the tenant 102 can then add transaction blocks(s) 301 to the blockchain 123.

The process starts in step 700. The blockchain manager 122 determines, in step 702, if the tenant 102 wants to add one or more transaction blocks 301. If the tenant 102 does not want to add any transaction blocks 301, in step 702, the process of step 702 repeats. If the tenant 102 wants to add one or more transaction blocks 301 in step 702, the authentication module 121 determines, in step 704, if the tenant 102 has provided the proper authentication credentials required to add the transaction block(s) 301 to the blockchain 123. If the tenant 102 has not provided the proper authentication credentials in step 704, the authentication manager 121 denies the authentication request in step 706 and the process goes back to step 702.

Otherwise, if the tenant 102 has provided the proper authentication credentials, in step 704, the blockchain manager 122 gets, in step 708, the tenant information 303 necessary to store the transaction a transaction block 301 in the blockchain 123. The tenant information 303 may be any type of information, such as, a contract, a record, record of a digital exchange of cryptocurrency, a document, a description of an event, and/or the like. In one embodiment, the tenant 102 may encrypt the tenant information 303 before submitting it to the blockchain manager 122. Alternatively, the BaaS 120 may provide the encryption services, or the tenant information 303 may elect to not encrypt the tenant information 303.

The blockchain manager 122 generates, in step 710, the block token 305. The block token 305 is a unique identifier of the transaction block 301. The blockchain manager 122 stores the transaction(s) as transaction block(s) 301 in the blockchain 123 (including the block token 305) in step 712. The block token(s) 305 are returned to the tenant 102 for later use in accessing the stored transaction blocks 301 in step 714.

The blockchain manager 122 determines, in step 716, if the process is complete. If the process is not complete in step 716, the process goes back to step 702. Otherwise, if the process is complete in step 716, the process ends in step 718.

FIG. 8 is a flow diagram for granting access and auditing stored transaction block(s) 301 for a Blockchain as a Service (BaaS) 120. The process starts in step 800. The blockchain manager 122 determines, in step 802, if a request to access a transaction block(s) 301/do an audit is received. If a request to access a transaction block(s) 301/do an audit is not received in step 802, the process of step 802 repeats.

Otherwise, if a request to access a transaction block(s) 301/do an audit is received in step 802, the authentication module 121 determines, in step 804, if the tenant 102 has provided the proper authentication credential(s) to access the transaction block(s) 301. The access may be to access a specific transaction block 301, access multiple transaction blocks 301, or to do an audit (access all tenant transaction blocks 301). For example, using the blockchains 123A-123N of FIG. 5, the tenant 102A may request access to the transaction block 301AA (or any individual transaction block 301 of the tenant 102A), request access to the transaction blocks 301AA and 301AC, may request to audit the transaction blocks 301AA, 301AC, and 301CN (all transactions blocks of tenant 102A), or the like. Access to each of these may require a different authentication level. For example, access to transaction block 301AA may require level one authentication, access to transaction blocks 301AA and 301AC may require level two authentication (e.g., transaction block 301AC may require level two access), and auding access may require level three authentication (e.g., providing three authentication factors or different authentication factors). In other words, the type of access (e.g., create, read, and audit) may require different set of authentication credentials. In addition, some of the types of access may require the same authentication credentials. For example, for read/write access, the tenant 102 may only need to provide level one authentication credentials and for audit, the tenant 102 will need to provide level two authentication credentials.

If the tenant 102 has not provided the proper authentication credentials in step 804, the tenant 102 is denied access in step 806. The process then goes back to step 802.

Otherwise, if the tenant 102 has provided the proper authentication credential(s), in step 804, the blockchain manager 122 gets, in step 808, the block token(s) 305. The block token(s) 305 may optionally be provided (indicated by the dashed lines) as part of the request to access the transaction block(s) 301. In one embodiment, the block tokens 305 of step 808 may not be used. In this embodiment, the authentication credentials may be exclusively used. In this case, the tenant 102 will have access to all transaction blocks that support the authentication level. Alternatively, the block tokens 305 may be exclusively used. The requested transaction block(s) 301 (e.g., the encrypted tenant information 303 stored in the transaction block(s) 301) is retrieved in step 810 and then provided to the tenant 102 in step 812. For example, the tenant 102A may provide the block token 305A and a valid username/password in step 804. The tenant 102A will then receive the tenant information 303A for the transaction block 301A in step 812.

The blockchain manager 122 determines, in step 814, if the process is complete. If the process is not complete in step 814, the process goes back to step 802. Otherwise, if the process is complete in step 814, the process ends in step 816.

Figure 9:
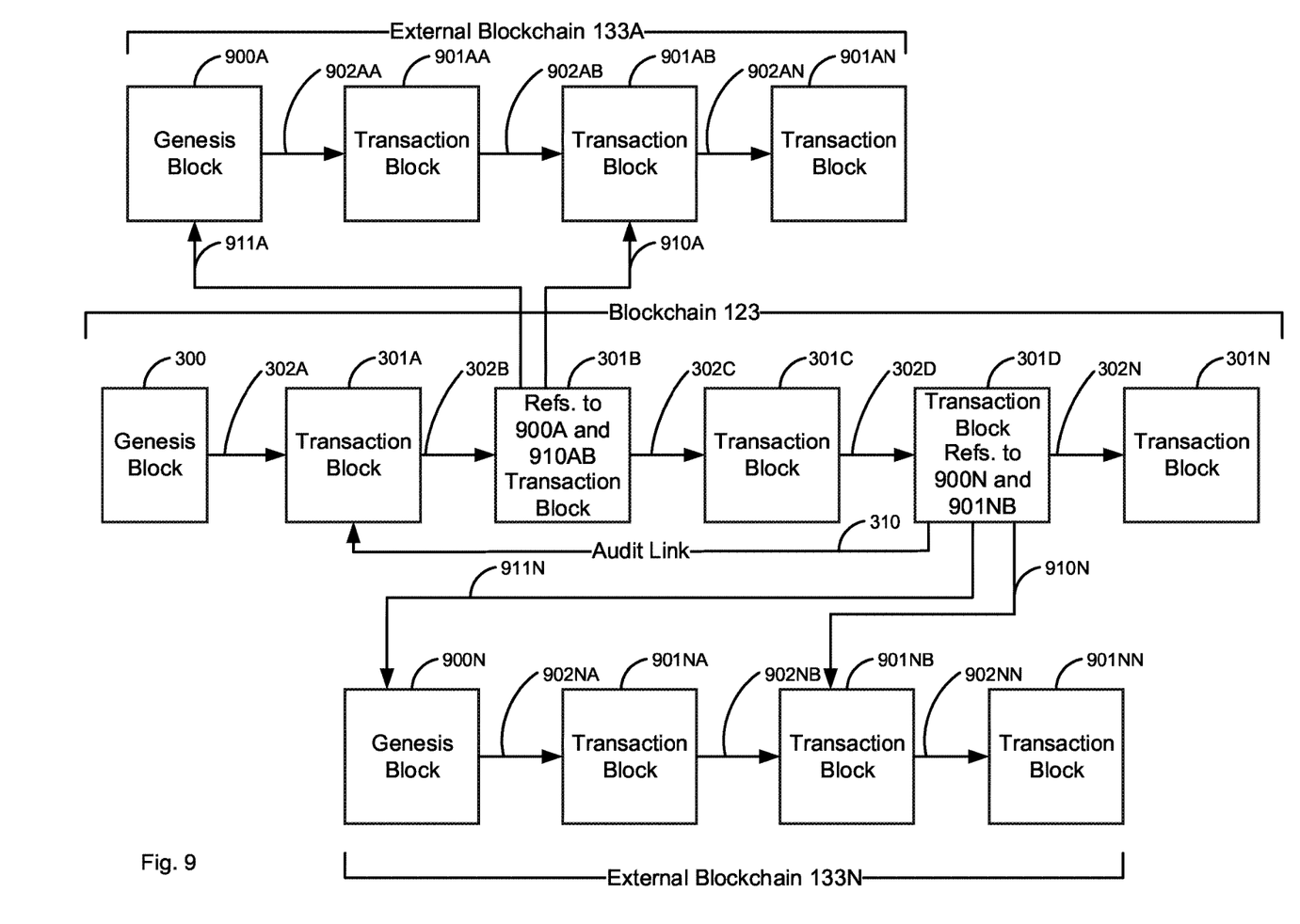
FIG. 9 is a block diagram of an exemplary blockchain that is used for providing a blockchain escrow and auditing service for transactions stored in external blockchains.

FIG. 9 is a block diagram of an exemplary blockchain 123 that is used for providing a blockchain escrow and auditing service for transactions stored in external blockchains 133. FIG. 9 comprises the blockchain 123 and external blockchains 133A-133N. The blockchain 123 comprises the genesis block 300, transaction blocks 301A-301N, and forward links 302A-302N. The external blockchain 133A comprises a genesis block 900A, transaction blocks 901AA-901AN, and forward links 902AA-902AN. The external blockchain 133N comprises a genesis block 900N, transaction blocks 901NA-901NN, and forward links 902NA-902NN.

The use of a blockchain 123 in the SaaS 120 can be extended as a transactional backup for external disparate blockchain transactions from an external blockchain (e.g., external blockchains 133A-133N). As each transaction block 901 is made in the external blockchain 133, the transaction can be added to the blockchain 123 in the SaaS 120. The added transaction block 301 has a pointer(s) to the separate blockchain 133 and/or as well as a copy of the transaction block 901/information from the separate blockchain 133. For example, the transaction block 301B has pointers to the genesis block 900A (911A) and the transaction block 901B (910A). Likewise, the transaction block 301D has pointers to the genesis block 900N (911N) and the transaction 901NB (910N). The pointer 911 is used to identify the genesis block 300 of the external blockchain 133 and the pointer 910 is used to identify the corresponding transaction block 901 in the external blockchains 133A-133N.

The transaction blocks 301B/301N is an audit record for the transactional blocks 901AB/901NB in the external blockchains 133A/133N. The transaction blocks 301B/301D can be reviewed and validated independently to generate a transaction audit log to cross correlate that the transactions were performed. These entries can also be used to demonstrate tampering with the external blockchains 133A-133N and enable corrective action by re-insertion.

One of the key advantages is that the escrow processes described herein are much more cost effective than traditional services for providing a limited number of transactions. In addition, the escrow process also provides a unique authentication process for accessing transaction blocks 901AB/901NB and auditing of transaction blocks 301B/301D in the same blockchain 123 or between blockchains 133.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a microprocessor; and
   a computer readable medium, coupled with the microprocessor and comprising microprocessor readable and executable instructions that, when executed by the microprocessor, cause the microprocessor to:
   receive, from a first tenant, a request to authenticate a first authentication credential by a Blockchain as a Service (BaaS);
   determine that the first authentication credential of the first tenant associated with the request to authenticate to the BaaS is valid;

in response to determining that the first authentication credential of the first tenant associated with the request to authenticate to the BaaS is valid, grant a first level of access to the BaaS;

receive a first request, from the first tenant, to add a first transaction block to a first blockchain in the BaaS, wherein the first blockchain in the BaaS is interspersed with transaction blocks from a plurality of tenants of the BaaS and wherein only one tenant of the plurality of tenants is associated with each transaction block; and add the first transaction block to the first blockchain in the BaaS based on the first level of access.

2. The system of claim 1, wherein the microprocessor readable and executable instructions further cause the microprocessor to:

receive a second request, from the first tenant, to add a second transaction block to the first blockchain in the BaaS;

add the second transaction block to the first blockchain in the BaaS; and add a first audit link, in the second transaction block, that points to the first transaction block, wherein the first audit link is used to audit the first transaction block.

3. The system of claim 2, wherein the microprocessor readable and executable instructions further cause the microprocessor to:

receive a third request, from the first tenant, to add a third transaction block, wherein the third transaction block is added to a second blockchain in the BaaS;

add the third transaction block to the second blockchain in the BaaS; and add a second audit link, in the third transaction block, that points to the second transaction block, wherein the second audit link is used to audit the second transaction block.

4. The system of claim 1, wherein the first transaction block is encrypted using a first encryption key of the first tenant and wherein the microprocessor readable and executable instructions further cause the microprocessor to:

receive a second request, from a second tenant, to add a second transaction block to the first blockchain in the BaaS; and add the second transaction block to the first blockchain of the BaaS, wherein the second transaction block of the first blockchain of the BaaS is encrypted using a second encryption key of the second tenant.

5. The system of claim 4, wherein the first transaction block and the second transaction block comprise one or more fields that are encrypted by a service provider of the BaaS.

6. The system of claim 1, wherein the microprocessor readable and executable instructions further cause the microprocessor to:

generate a block token associated with the first transaction block; and return the block token associated with the first transaction block to the first tenant.

7. The system of claim 6, wherein the microprocessor readable and executable instructions further cause the microprocessor to:

receive a request, from the first tenant, to get the first transaction block, wherein the request to get the first transaction block comprises the block token associated with the first transaction block; and return tenant information in the first transaction block to the first tenant.

8. The system of claim 1, wherein the first blockchain in the BaaS is a first active blockchain and wherein the microprocessor readable and executable instructions further cause the microprocessor to:

receive a second request, from the first tenant, to add a second transaction block, wherein the second transaction block is added to a second active blockchain in the BaaS based on an allocation of a block load balancer, wherein the first active blockchain and the second active blockchain are concurrently active, and wherein the second active blockchain in the BaaS is interspersed with transaction blocks from the plurality of tenants.

9. The system of claim 1, wherein the microprocessor readable and executable instructions further cause the microprocessor to:

receive a second request, from the first tenant, to add a second transaction block to the first blockchain in the BaaS, wherein the first transaction block is encrypted using a first encryption key of the first tenant and wherein the second transaction block is encrypted using a second encryption key of the first tenant.

10. The system of claim 1, wherein the first blockchain in the BaaS has a plurality of transaction blocks of the first tenant and wherein the first transaction block requires the first authentication credential of the first tenant to get the first level of access to the first transaction block and wherein a second transaction block of the plurality of transaction blocks of the first tenant requires at least a second authentication credential of the first tenant to get a second level of access to the second transaction block.

11. The system of claim 1, wherein at least some of the interspersed transaction blocks from the plurality of tenants of the BaaS are unrelated to each other.

12. The system of claim 1, wherein the first transaction block is a transactional backup for an external transaction block stored in an external blockchain and wherein the first transaction block comprises one or more pointers to the external blockchain.

13. The system of claim 1, wherein a format of the first transaction block is based on a first template of a plurality of templates and wherein the first tenant selects the first template based on one of: creation of an account or adding the first transaction block.

14. A method comprising:

receiving, by a microprocessor, from a first tenant, a request to authenticate a first authentication credential by a Blockchain as a Service (BaaS);

determining, by the microprocessor, that the first authentication credential of the first tenant associated with the request to authenticate to the BaaS is valid;

in response to determining that the first authentication credential of the first tenant associated with the request to authenticate to the BaaS is valid, granting, by the microprocessor, a first level of access to the BaaS;

receiving, by the microprocessor, a first request, from the first tenant, to add a first transaction block to a first blockchain in the BaaS, wherein the first blockchain in the BaaS is interspersed with transaction blocks from a plurality of tenants of the BaaS and wherein only one tenant of the plurality of tenants is associated with each transaction block herein; and adding, by the microprocessor, the first transaction block to the first blockchain in the BaaS based on the first level of access.

15. The method of claim 14, further comprising:
receiving a second request, from the first tenant, to add a second transaction block to the first blockchain in the BaaS;
adding the second transaction block to the first blockchain in the BaaS; and
adding a first audit link, in the second transaction block, that points to the first transaction block, wherein the first audit link is used to audit the first transaction block.

16. The method of claim 14, wherein the first transaction block is encrypted using a first encryption key of the first tenant and further comprising:
receiving a second request, from a second tenant, to add a second transaction block to the first blockchain in the BaaS; and
adding the second transaction block to the first blockchain of the BaaS, wherein the second transaction block of the first blockchain of the BaaS is encrypted using a second encryption key of the second tenant.

17. The method of claim 14, further comprising:
generating a block token associated with the first transaction block;
returning the block token associated with the first transaction block to the first tenant;
receiving a request, from the first tenant, to get the first transaction block, wherein the request to get the first transaction block token comprises the block token associated with the first transaction block; and
returning tenant information in the first transaction block to the first tenant.

18. The method of claim 14, wherein the first blockchain in the BaaS is a first active blockchain and further comprising:
receiving a second request, from the first tenant, to add a second transaction block, wherein the second transaction block is added to a second active blockchain in the BaaS based on an allocation of a block load balancer, wherein the first active blockchain and the second active blockchain are concurrently active, and wherein the second active blockchain in the BaaS is interspersed with transaction blocks from the plurality of tenants.

19. The method of claim 14, wherein the first blockchain in the BaaS has a plurality of transaction blocks of the first tenant and wherein the first transaction block requires the first authentication credential of the first tenant to get the first level of access to the first transaction block and wherein a second transaction block of the plurality of transaction blocks of the first tenant requires at least a second authentication credential of the first tenant to get a second level of access to the second transaction block.

20. A non-transient computer readable medium having stored thereon instructions that cause a processor to execute a method, the method comprising instructions to:
receive, from a first tenant, a request to authenticate a first authentication credential by a Blockchain as a Service (BaaS);
determine that the first authentication credential of the first tenant associated with the request to authenticate to the BaaS is valid;
in response to determining that the first authentication credential of the first tenant associated with the request to authenticate to the BaaS is valid, grant a first level of access to the BaaS;
receive a first request, from the first tenant, to add a first transaction block to a first blockchain in the BaaS,
wherein the first blockchain in the BaaS is interspersed with transaction blocks from a plurality of tenants of the BaaS and wherein only one tenant of the plurality of tenants is associated with each transaction block; and
add the first transaction block to the first blockchain in the BaaS based on the first level of access.

* * * * *